/ United States Patent /

(12) United States Patent
Ashley et al.

(10) Patent No.: US 9,729,519 B1
(45) Date of Patent: Aug. 8, 2017

(54) EMAIL APPLICATION FOR SYNTHETIC IDENTITIES

(71) Applicant: Anonyome Labs, Inc., Draper, UT (US)

(72) Inventors: Paul Ashley, Queensland (AU); Steve Shillingford, Draper, UT (US); Greg Clark, San Francisco, CA (US); Simon Gee, Queensland (AU); Tim Bartley, Queensland (AU)

(73) Assignee: Anonyome Labs, Inc., Draper, UT (US)

( * ) Notice: Subject to any disclaimer, the term of this patent is extended or adjusted under 35 U.S.C. 154(b) by 119 days.

(21) Appl. No.: 14/580,132

(22) Filed: Dec. 22, 2014

Related U.S. Application Data

(60) Provisional application No. 62/079,476, filed on Nov. 13, 2014.

(51) Int. Cl.
*H04L 9/32* (2006.01)
*H04L 29/06* (2006.01)
*H04L 12/58* (2006.01)

(52) U.S. Cl.
CPC .......... *H04L 63/0428* (2013.01); *H04L 51/18* (2013.01)

(58) Field of Classification Search
CPC ..................................................... H04L 51/18
USPC ........................................................ 713/168
See application file for complete search history.

(56) References Cited

U.S. PATENT DOCUMENTS

| 8,645,348 | B2* | 2/2014 | Shiloh | G06F 21/6254 707/705 |
|---|---|---|---|---|
| 9,104,630 | B1* | 8/2015 | Klein | G06F 11/1469 |
| 2011/0179275 | A1* | 7/2011 | Thayer | H04L 12/58 713/169 |
| 2011/0239284 | A1* | 9/2011 | Kaji | G06F 21/305 726/6 |
| 2012/0050286 | A1* | 3/2012 | Yockey | A63F 13/55 345/420 |
| 2013/0024323 | A1* | 1/2013 | Tomassen | G06Q 30/06 705/26.35 |
| 2014/0244998 | A1* | 8/2014 | Amenedo | H04L 63/062 713/156 |
| 2014/0365569 | A1* | 12/2014 | Vyrros | H04L 51/00 709/204 |
| 2015/0058167 | A1* | 2/2015 | McLaughlin | G06Q 30/0623 705/26.61 |
| 2015/0106231 | A1* | 4/2015 | Kamdar | G06Q 30/0609 705/26.35 |

* cited by examiner

*Primary Examiner* — Taghi Arani
*Assistant Examiner* — Khalil Naghdali
(74) *Attorney, Agent, or Firm* — Cooley LLP

(57) ABSTRACT

A machine has a processor and a memory connected to the processor. The memory stores instructions executed by the processor to receive an email account request, a name and a public key. A selected domain name is designated from a group of available domain names. A user name is generated based upon the name. An email account is formed using the user name and the selected domain name. The public key is stored.

6 Claims, 10 Drawing Sheets

EMAIL APPLICATION FOR SYNTHETIC IDENTITIES

CROSS-REFERENCE TO RELATED APPLICATION

This application claims priority to U.S. Provisional Patent Application Ser. No. 62/079,476, filed Nov. 13, 2014, the contents of which are incorporated herein by reference.

FIELD OF THE INVENTION

This invention relates generally to communications in computer networks. More particularly, this invention relates to an email application for synthetic identities utilized in computer network communications.

BACKGROUND OF THE INVENTION

With the growing awareness of corporate misuse of private user information and increases in identity theft, users are looking for ways to protect their privacy. One approach is for a user to compartmentalize their activities so that tracking of their activities and collection of their personal information is both limited in scope and is not useful. One method to achieve compartmentalization is for a user to create multiple synthetic identities and use them for different purposes. For example, one identity is used for online shopping, another identity for social media interaction and another for use in a real world social situation when meeting a new person. The compartmentalization limits the scope and usefulness of information collected about an identity's online and offline activities, and minimizes the impact when identity data is stolen.

For a user to be effective with their multiple synthetic identities, a user needs access to a full suite of capabilities that allows them to operate in the context of that identity. For example, they may need a different name, phone number, email address, shipping address and so on and be able to uses these capabilities when operating in the context of the identity.

There is a need to provide email for a user to operate safely in the context of a synthetic identity. In any given week a user may operate with their real identity and with a number of synthetic identities. The user needs to be enabled to use their email across those identities without inadvertently disclosing their identities.

A review of current email systems shows that they are not suitable for managing synthetic identities. Email clients (technically Message User Agents or MUAs) are designed for supporting aggregation of the user's email accounts into one view. The email clients allow the user to enter username/password information for a number of email providers (technically Message Transfer Agents (MTAs) or Message Delivery Agents (MDAs)).

Additionally the process of creating each of those email accounts is outside of the scope of the email client and may involve the user working through complex and different registration process at each email provider. These email providers want real identity information such as name, email address, date of birth and mobile phone number. Giving up real identity data for each synthetic identity is not desirable.

Existing email clients are designed for aggregation rather than identity compartmentalization. That is, the email clients do not provide the capabilities to ensure a user stays in context of a particular identity.

Email providers themselves are unsuitable for synthetic identities. Some synthetic identities are short lived and the synthetic identity email accounts need to be easily created and deleted at will by the user. With the complex registration process and the lack of assurance that accounts and emails will ever be deleted from current email providers, they are unsuitable to serve both the dynamic nature and privacy requirements of synthetic identities.

Email providers give no assurance of the privacy of the user's emails, and in most cases the providers themselves declare in their terms and conditions that they can use the email content for their own purposes. Add to that the exposure of real identity data at each email provider and one is left with an inadequate privacy environment for synthetic identities.

In view of the foregoing, there is a need for an email application that supports synthetic identities.

SUMMARY OF THE INVENTION

A machine has a processor and a memory connected to the processor. The memory stores instructions executed by the processor to receive an email account request, a name and a public key. A selected domain name is designated from a group of available domain names. A user name is generated based upon the name. An email account is formed using the user name and the selected domain name. The public key is stored.

A machine has a processor and a memory connected to the processor. The memory stores instructions executed by the processor to prompt a user for a name associated with a request for an email account. A private key and a public key for the email account are generated. The public key, the name and the request for an email account are sent to an email provider. The private key is stored.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
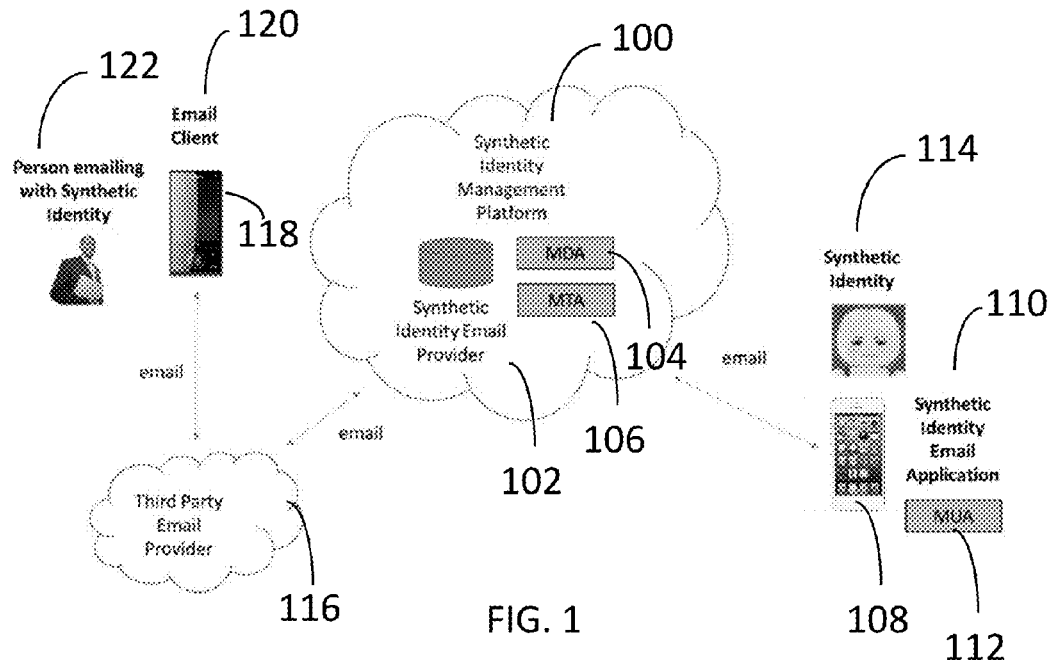
FIG. 1 illustrates components associated with an embodiment of the invention.

FIG. 1 illustrates a synthetic identity management platform 100, which may be a server or cluster of servers. The platform executes a synthetic identity email provider 102 application, which implements operations described herein. In particular, the synthetic identity email provider 102 includes instructions executed by a processor of the management platform 100 to implement operations disclosed herein. The synthetic identity email provider 102 application has an associated MDA 104 and/or MTA 106.

A client device 108 executes a synthetic identity email application 110, which may have an associated MUA 112 to support a synthetic identity 114. The synthetic identity email application 110 performs operations described below. More particularly, the synthetic identity email application 110 includes instructions executed by a processor of a client device 108 to implement operations disclosed herein.

The synthetic identity management platform 100 may be operative with a third party email provider 116. A client device 108 executes an email client application 120, which allows a user 122 to send emails with a synthetic identity. The third party email provider 116 communicates with a client device 118 that runs an email client 120 for a user 122.

Figure 2:
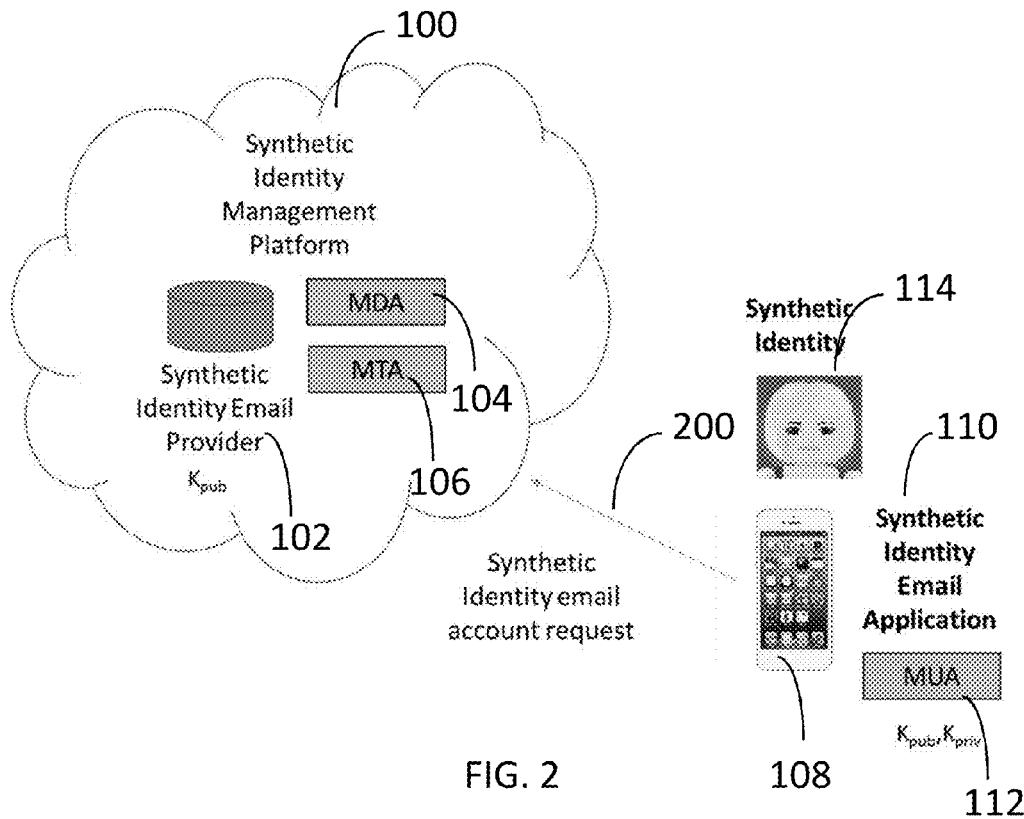
FIG. 2 illustrates operations for requesting a synthetic identity email account in accordance with an embodiment of the invention.

FIG. 2 shows a first scenario where the user requests a new email account for a synthetic identity, as shown with arrow 200. The user requests the account from their synthetic identity email application 110. The application generates a public/private key pair denoted as $K_{pub}$, $K_{priv}$ (e.g., RSA 2048 bits), which is later used to protect the email content at the synthetic identity email provider 102. The public key $K_{pub}$ is transferred to the synthetic identity email provider 102 so that it can encrypt incoming and outgoing emails. The private key $K_{priv}$ never leaves the user's mobile device so the user can be sure only they are able to decrypt their own emails.

Figure 3:
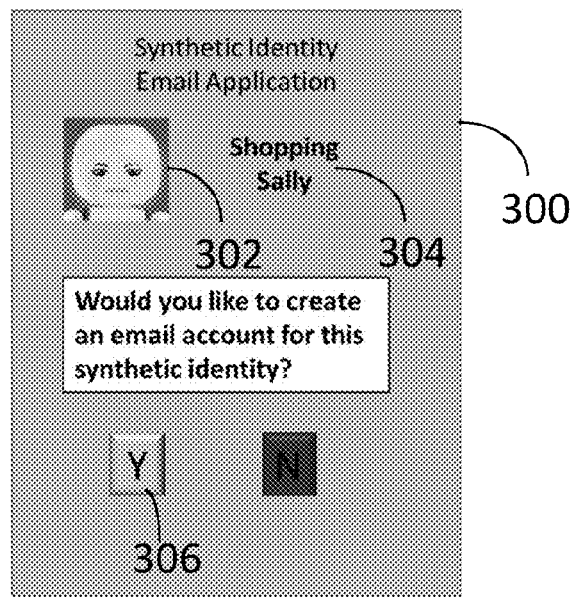
FIG. 3 illustrates a user interface to facilitate a user requesting an email account for a synthetic identity in accordance with an embodiment of the invention.

FIG. 3 shows a user interface 300 that is configured to allow the user to request a synthetic identity email account. The interface 300 includes an avatar 302 and name 304 of the synthetic identity. This reminds the user which identity is in context. The user interface 300 further includes a prompt 306 for account creation.

Figure 4:
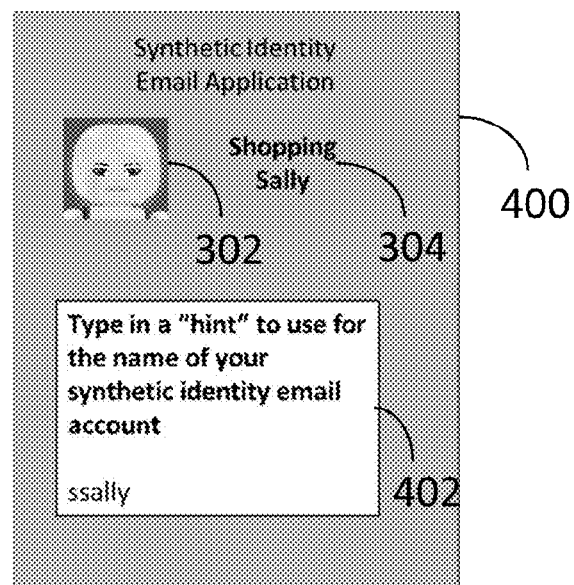
FIG. 4 illustrates a user interface to allow a user to define the name of a synthetic email account.

FIG. 4 shows a user interface 400 with a prompt 402 for a hint for the name of the email account. Because the avatar 302 and name of Shopping Sally 304 are shown, it reminds the user that they should create a name for the email account related to that synthetic identity. In the figure the hint ssally is used. Alternately, a name may be provided (e.g., Shopping Sally) and the name may be used to automatically generate a user name to be combined with a domain name that establishes an email account.

Figure 5:
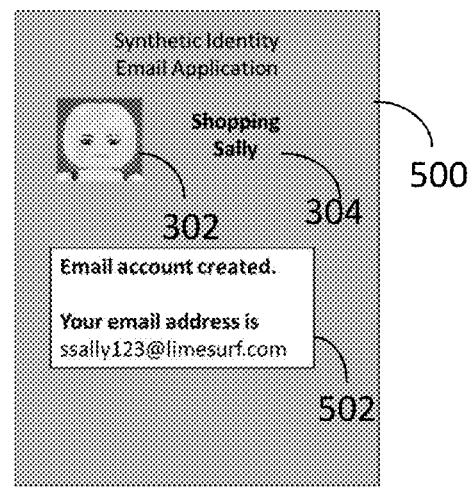
FIG. 5 illustrates a user interface displaying a generated synthetic identity email account.

FIG. 5 shows an interface 500 characterizing the newly created email account. As shown in block 502, the synthetic identity email provider 102 has generated the name ssally123 and attached a domain limesurf.com. The domain is important in that it should not identify the account as being for a synthetic identity. To keep the domain information fresh and not expose the account as being from a synthetic identity, the synthetic identity email provider 102 maintains many domains at their disposal, and continually requests new ones, if need be.

Figure 6:
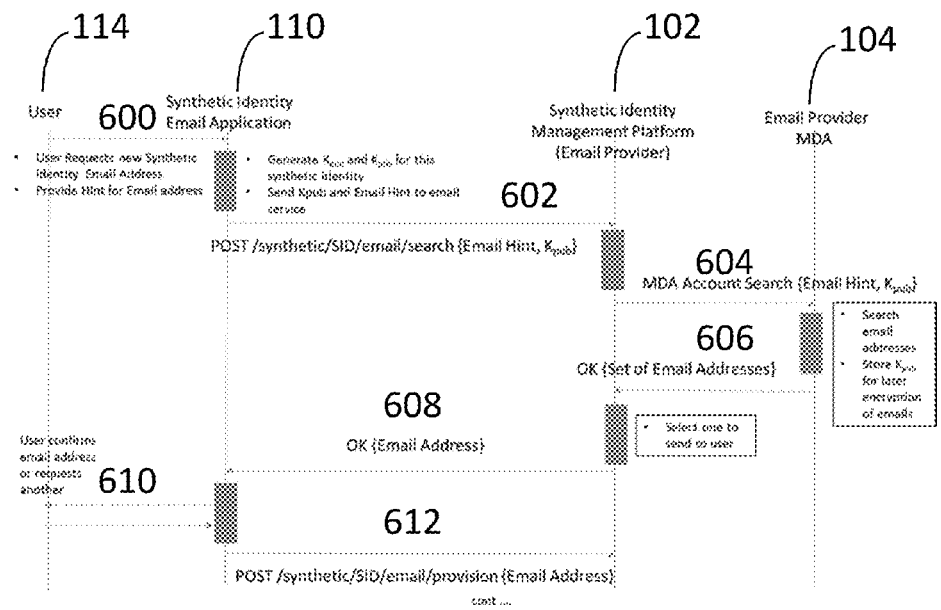
FIG. 6 illustrates processing operations associated with requesting a synthetic identity email account.

FIG. 6 shows processing operations for creating the synthetic identity email account. Interactions transpire between user 114, synthetic identity email application 110, synthetic identity management provider 102 and an email provider (e.g., MDA) 104. The user 114 initiates a request 600 with the email application 110. In particular, the user requests a new synthetic identity email address and provides a name or a hint for the email address. The synthetic identity email application 110 generates public and private keys for the synthetic identity. The public key and name (or hint) are then sent 602 to the synthetic identity email provider 102 (in this case part of the synthetic identity management platform 100). The email provider 102 initiates an account search 604. The email provider MDA 104 searches for possible email accounts and stores the public key for subsequent encryption of emails. The MDA 104 the returns 606 one or more available email addresses. The email provider 102 then sends 608 an email address for user 114 to approve. The user 114 may then approve the email address or request another 610. An approved email address is posted 612 to the email provider 102.

Figure 7:
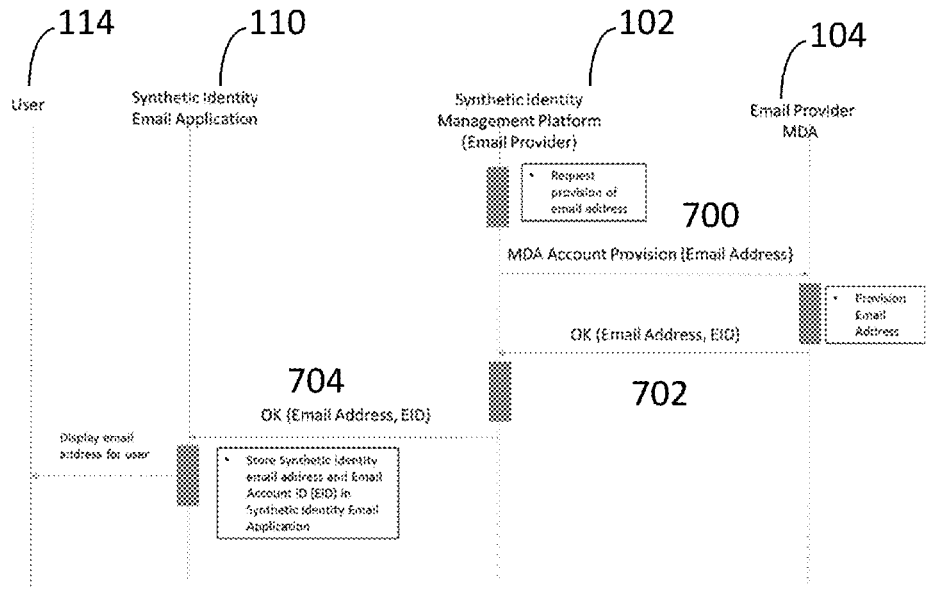
FIG. 7 illustrates additional processing operations associated with requesting a synthetic identity email account.

Turning to FIG. 7, after the approved email address is received by the email provider 102, the email provider 102 requests provision of the email address 700. The MDA 104 provisions the email address and sends an acknowledgement 702 back to the email provider 102. The email provider 102 then sends an acknowledgement 704 to the synthetic identity email application 110. The acknowledgement 704 may include a synthetic identity email account ID (EID).

Figure 8:
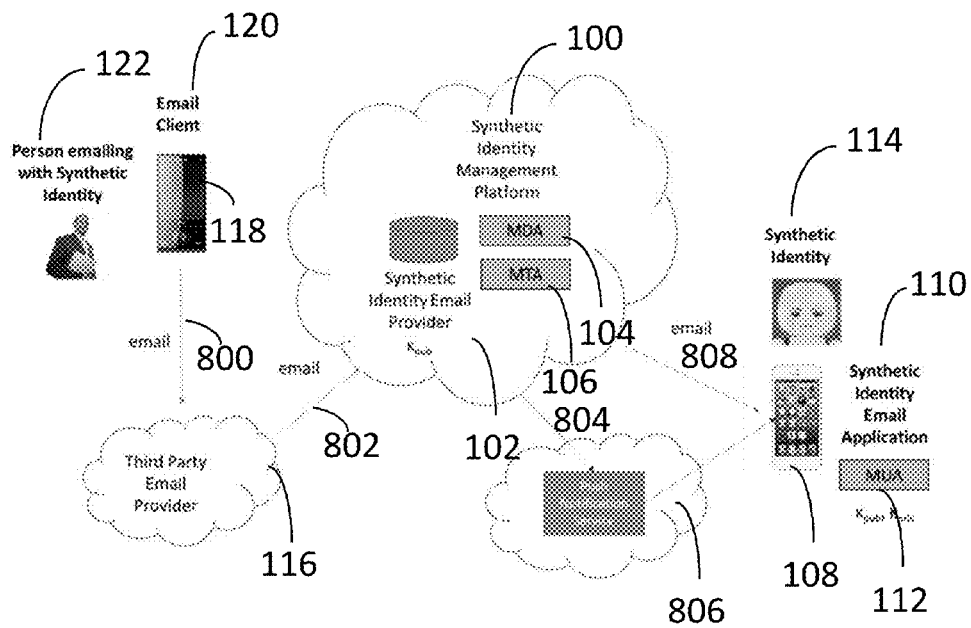
FIG. 8 illustrates the receipt of an email at the synthetic identity email account.

FIG. 8 shows the environment when a user wants to send an email to a synthetic identity email account. The user 122 has an email client 120 (or accesses their email provider via web browser) to send an email 800. This third party email provider 116 sends 802 the email to the synthetic identity email provider 102. When the email is received by the synthetic identity email provider two actions occur. The first action is that the email is encrypted with the public key $K_{pub}$ of the synthetic identity. Second, a notification 804 is sent to the synthetic identity email application 110 that an email has arrived for a synthetic identity. The notification is sent via the mobile operating system specific push notification service 806 (e.g., Apple® Push Notification Service). The notification is a signal for the synthetic identity email application 110 to call back to the synthetic identity email provider 102 to retrieve the encrypted email. The encrypted email is sent 808 to the email application 110. Once retrieved, the synthetic identity email application 110 decrypts the email using the synthetic identity's private key $K_{priv}$.

Figure 9:
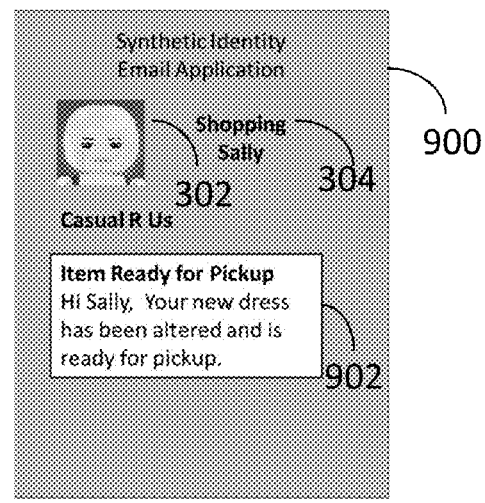
FIG. 9 illustrates a user interface showing that email has arrived for a synthetic identity.

FIG. 9 shows a user interface 900 associated with the synthetic identity email application. To make the context of the email message absolutely clear to the user, the interface shows the synthetic identity avatar 302 and name 304. It also shows the sender of the email (which is Casual R Us) and the email message 902.

Figure 10:
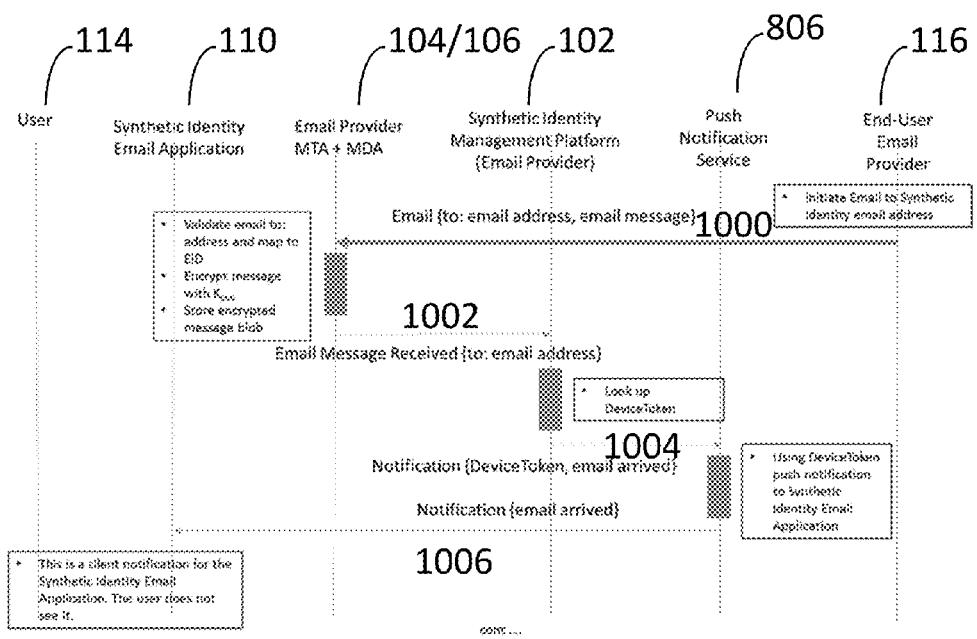
FIG. 10 illustrates processing associated with a synthetic identity email provider receiving email for a synthetic identity.

FIG. 10 shows the sequence diagram for receiving an email at the synthetic identity email provider. An email 1000 is sent from the end-user email provider 116 to the MTA/MDA 104/106. The provider verifies the incoming email address name, encrypts the message with the synthetic identity public key $K_{pub}$, and stores the encrypted email as a "blob". A notification is sent to the synthetic identity email application 110. In particular, an email notification 1002 is sent from the MTA/MDA to the email provider 102, which looks up a device token. The device token is an operating system specific value given to the user's mobile device/application so that it can be reached by a notification. A notification 1004 is then sent to the push notification service 806, which sends another notification 1006 to the email application 110.

Figure 11:
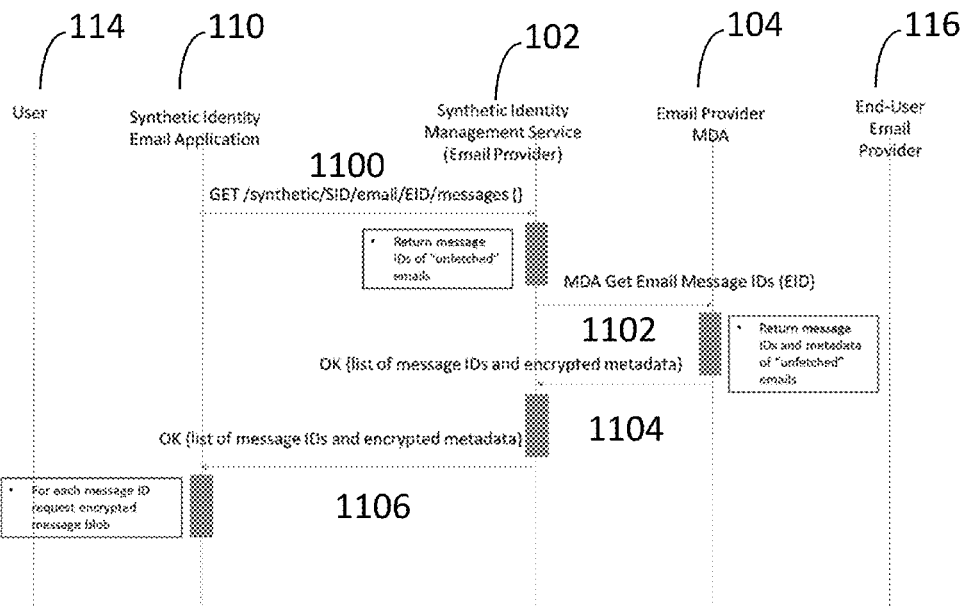
FIG. 11 illustrates additional processing associated with a synthetic identity email provider receiving email for a synthetic identity.

FIG. 11 shows the next phase of processing. The synthetic identity email application 110 calls 1100 the synthetic identity email provider 102 to retrieve the message (or messages). The email provider 102 fetches 1102 the email message identifications from the MDA 104. The MDA 104 returns 1104 the message identifications to the email provider 102, which sends 1106 them to the application 110.

Figure 12:
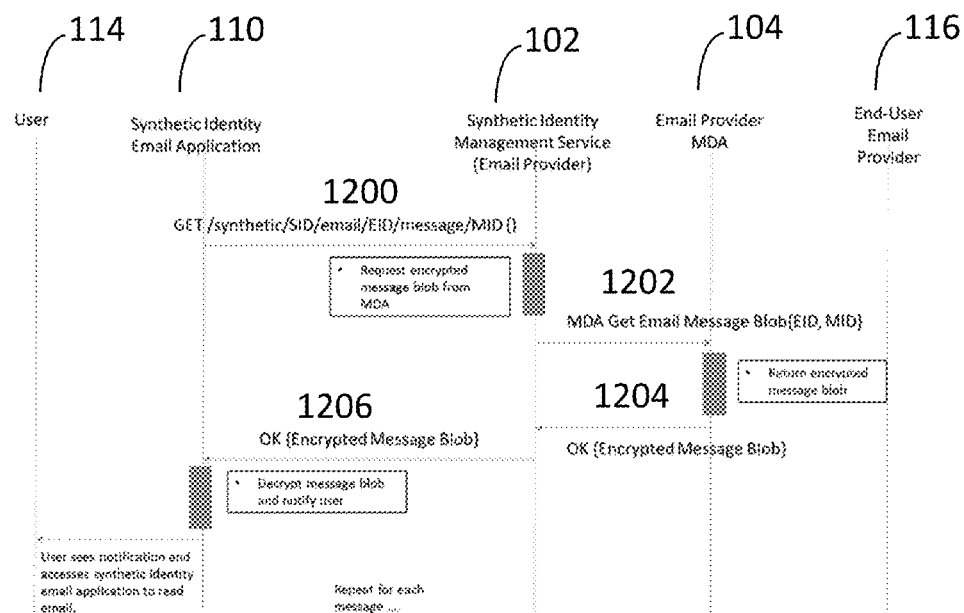
FIG. 12 illustrates additional processing associated with a synthetic identity email provider receiving email for a synthetic identity.

FIG. 12 shows the final sequence of processing. The email application 110 requests 1200 an encrypted message from the provider 102, which requests 1202 the message from the MDA 104. The MDA 104 supplies the encrypted message 1204 to the email provider 102. The email provider 102 sends 1206 the message to the application 110. The email application 110 then decrypts the message.

Figure 13:
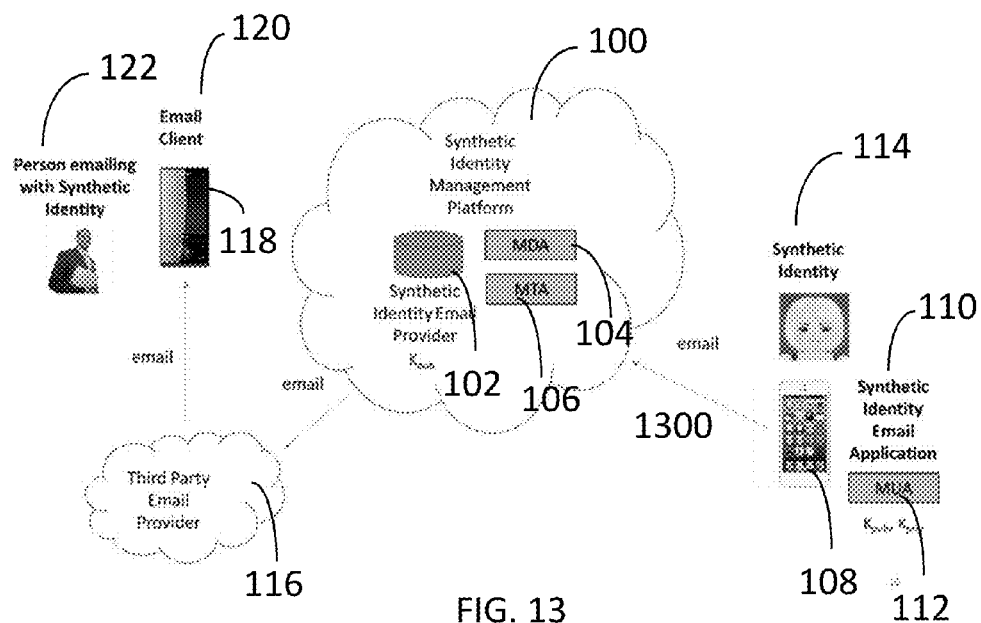
FIG. 13 illustrates the sending of an email from the synthetic identity email account.

FIG. 13 shows the environment in which a user wants to send an email from a synthetic identity email application 110. The user users the synthetic identity email application 110 to send an email 1300 to the synthetic identity email provider 102. When the email is received by the synthetic identity email provider 102 two actions occur. First, the unencrypted email is forwarded to the third party email provider 116 of the receiving user. The second action is that the email is encrypted with the public key $K_{pub}$ of the synthetic identity and stored as a blob. The receiving user 122 can access the email by an email client application 120 or browser.

Figure 14:
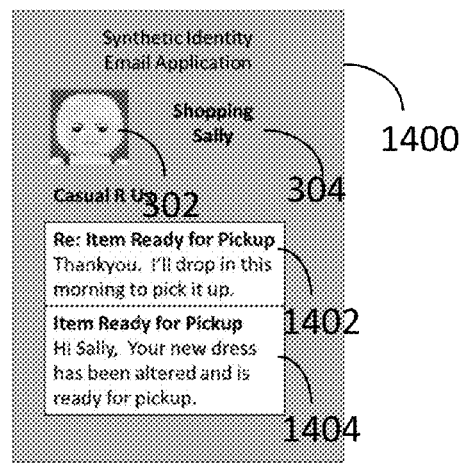
FIG. 14 illustrates a user interface to facilitate sending email from a synthetic identity email account.

FIG. 14 shows the user interface 1400 when sending an email from the synthetic identity email application 110. Again the avatar 302 and name 304 of the synthetic identity are shown. It also shows the party being emailed (Casual R Us). The top message 1402 is the email from the synthetic identity shown as a reply to the original email received 1404. The user interface enforces the compartmentalization and helps the user to remain in context and not make mistakes.

Figure 15:
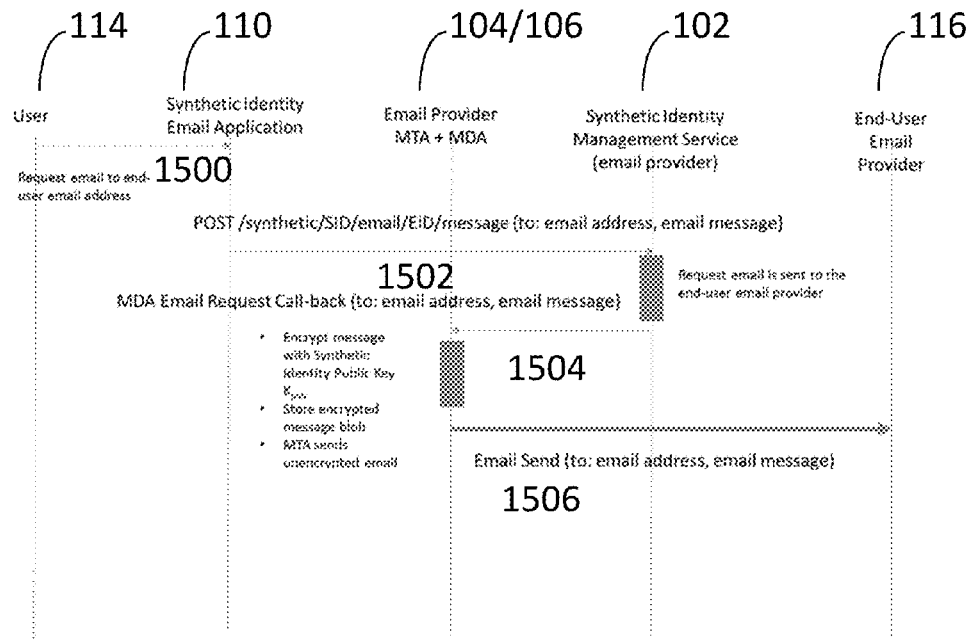
FIG. 15 illustrates processing associated with sending an email from a synthetic identity email account.

FIG. 15 shows the sequence for sending an email from a synthetic identity email application 110 to an email provider 116. The user 114 inputs 1500 into the synthetic identity email application 110 a draft of an email for the end user. The application 110 makes a request 1502 to the synthetic identity email provider 102 to send the email. The email provider 102 communicates 1504 with MTA/MDA 104/106 components to encrypt the outgoing message with the user's public key $K_{pub}$, store the encrypted message blob, and to send 1506 the unencrypted email to the end-user's email provider 116.

Figure 16:
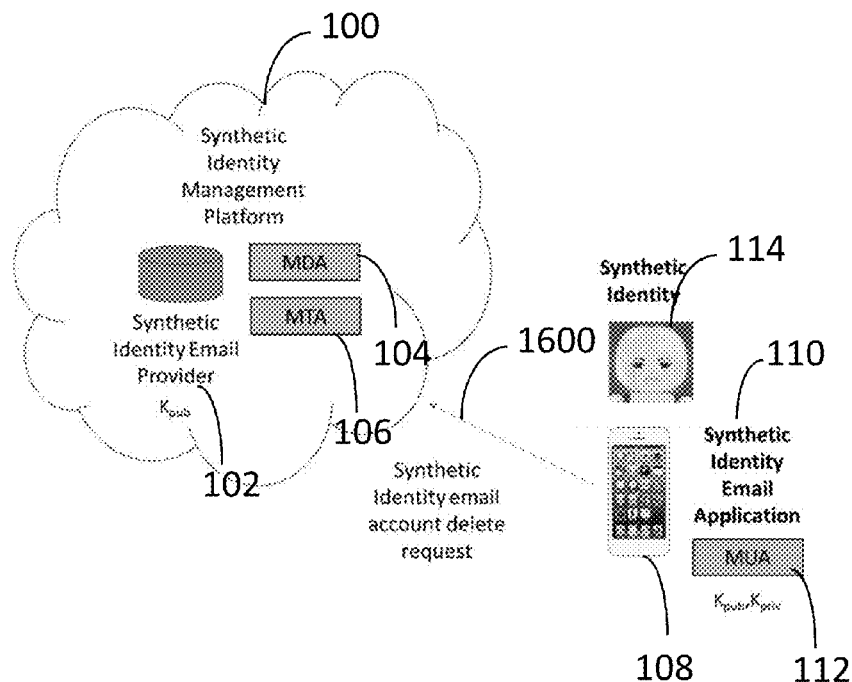
FIG. 16 illustrates a request for deletion of a synthetic identity email account.

FIG. 16 shows a request 1600 to delete the synthetic identity email account. When the request is received by the synthetic identity email provider 102 the synthetic identity's stored encrypted emails and metadata, and the email account are deleted.

Figure 17:
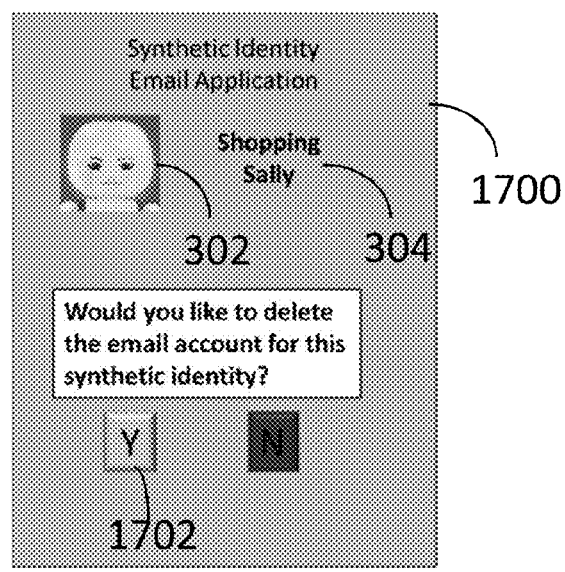
FIG. 17 illustrates a user interface for requesting deletion of a synthetic identity email account.

FIG. 17 is an exemplary user interface 1700 for synthetic identity email account deletion. The user is helped with the context by seeing both the avatar 302 and name 304 of the synthetic identity. Button 1702 is provided to delete the account.

Figure 18:
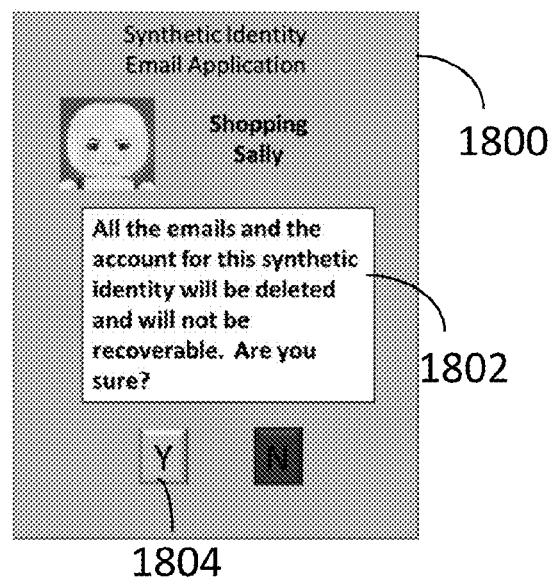
FIG. 18 illustrates a user interface to confirm the user wants the synthetic identity's emails and email account deleted.
Figure 19:
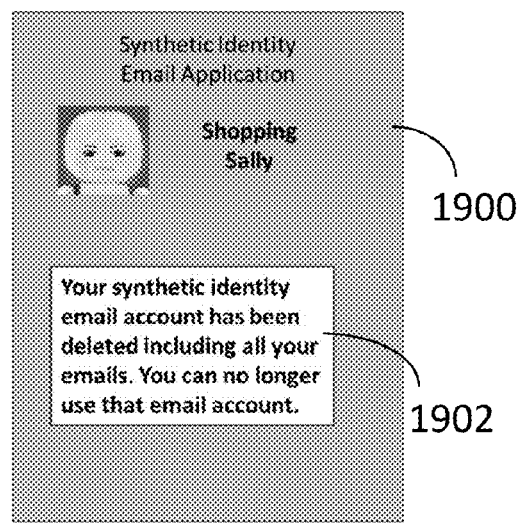
FIG. 19 illustrate a user interface to confirm that the account and all emails have been deleted.

FIG. 18 shows another user interface 1800 that may be presented to a user. Because of the irreversibility of the delete request, the user is supplied with a warning 1802 that not only will all of their synthetic identity emails be deleted, but also the account, such that they won't be able to receive any more emails for that synthetic identity. The terms can be agreed to using button 1804. FIG. 19 shows a final user interface 1900 with a confirmation 1902 that the synthetic identity email account and all of the emails for that account have been deleted. The email may be sent to another email account associated with the former synthetic identity.

Figure 20:
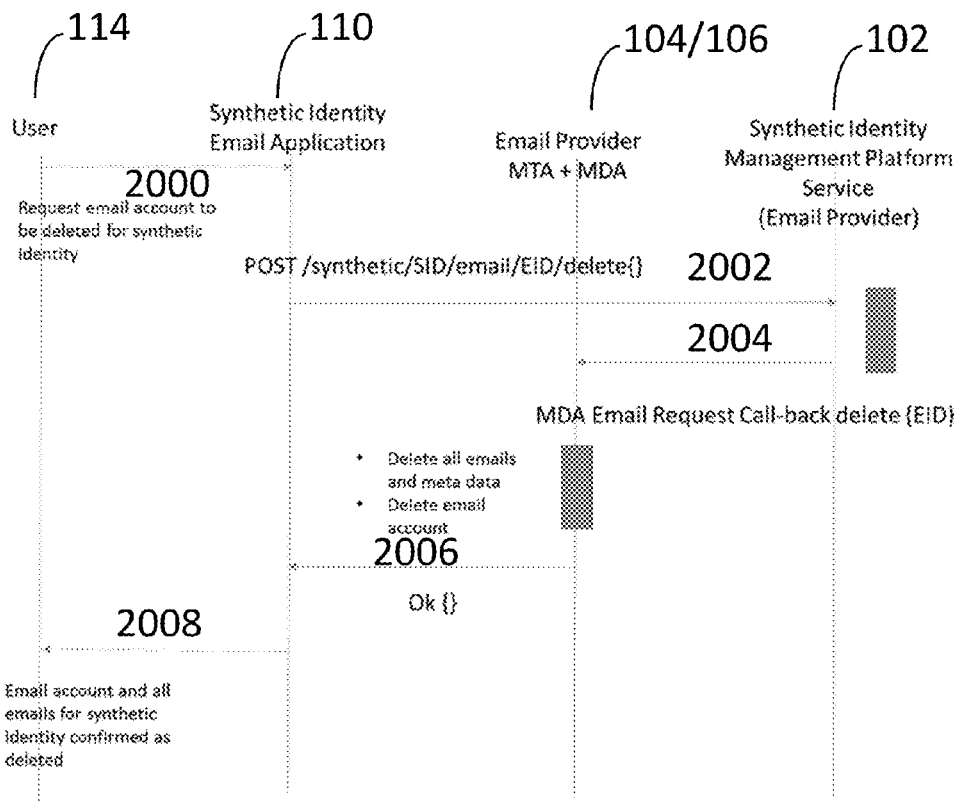
FIG. 20 illustrates processing to requesting deletion of a synthetic identity email account and emails.

FIG. 20 shows the sequence diagram of the request of the user to delete a synthetic identity email account and all associated emails. The user 114 enters a request 2000 into the email application 110. The email application posts 2002 a delete command to the email provider 102. The email provider instructs 2004 the MTA/MDA 104/106 to delete all emails, metadata and the email account itself. Confirmation of the command may be solicited from the user, as discussed above. After confirmation or in response to a delete command, the emails, metadata and email account are deleted and a message 2006 is sent to the email application 110, which may be displayed 2008 to the user 114.

The disclosed technology rectifies a number of shortcomings associated with prior art systems. For example, the disclosed email clients provide strong compartmentalization capabilities such that a user is always sure in which context the user is operating. Thus, the chances of mistakes are minimized. Advantageously, email accounts for each synthetic identity are created and deleted at the user's discretion. There is assurance that when a user deletes a synthetic identity that the email account is truly deleted. The disclosed email accounts have privacy protection, such that the user's synthetic identity email is not exploited by the email provider and real identity data is not exposed if there is a security breach at the provider.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising:
a processor; and
a memory connected to the processor, the memory storing instructions executed by the processor to:
  receive an email account request, a name and a public key from a client machine at a synthetic identity management platform used to manage a plurality of synthetic identities for a real user, wherein each synthetic identity of the plurality of synthetic identities has different identity attributes including name and email address,
  designate at the synthetic identity management platform a selected domain name from a group of available domain names, wherein each available domain name is associated with an email provider separate from the synthetic identity management platform,
  generate at the synthetic identity management platform a user name based upon the name,
  request by the synthetic identity management platform provision of an email account using the user name and the selected domain name, wherein the email account is associated with an email provider machine separate from the synthetic identity management platform and wherein the email account corresponds to a synthetic identity that does not reveal the real user,
  initiate from the synthetic identity management platform a push notification to the email account, wherein the push notification is a mobile operating system specific push notification service acknowledged by a synthetic identity email application on the client machine without user intervention, wherein the push notification is a silent notification for the synthetic identity email application that a user does not see,
  receive a message request from the synthetic identity email application on the client machine responsive to the push notification, and
  coordinate delivery of a message from the email provider, to the synthetic identity management platform and to the synthetic identity email application on the client machine in response to the message request.

2. The machine of claim 1 wherein the memory stores instructions executed by the processor to:
  receive an email account deletion request, and
  delete the email account, email associated with the email account and metadata associated with the email account in response to the email account deletion request.

3. The machine of claim 2 wherein the memory stores instructions executed by the processor to prompt a user of the email account to confirm the email account deletion request.

4. The machine of claim 2 wherein the memory stores instructions executed by the processor to send a confirmatory message to a user of the email account after the delete of the email account.

5. A client machine, comprising:
a processor, and
a memory connected to the processor, the memory storing a synthetic identity email application with instructions executed by the processor to:
  prompt a user for a name associated with a request for an email account, wherein the name is a synthetic identity that does not reveal a real user and the synthetic identity is one of a plurality of synthetic identities associated with the real user, wherein each synthetic identity of the plurality of synthetic identities has different identity attributes including name and email address,
  generate a private key and a public key for the email account,
  send the public key, the name and the request for an email account from the synthetic identity email application to a synthetic identity management platform,
  store the private key,
  receive a push notification, wherein the push notification is a mobile operating system specific push notification service acknowledged by the synthetic identity email application without user intervention, wherein the push notification is a silent notification for the synthetic identity email application that a user does not see,
  supply message request prompts,
  request a message based upon input responsive to the message request prompts, wherein the request is from the synthetic identity email application to the synthetic identity management platform, which communicates with an email provider separate from the synthetic identity management platform,
  receive an encrypted message responsive to the request from the email provider, and
  decrypt the encrypted message using the private key.

6. The machine of claim 5 wherein the memory stores instructions executed by the processor to prompt a user for an avatar associated with the request for an email account.

* * * * *